US008329047B2

(12) United States Patent
Nagami et al.

(10) Patent No.: US 8,329,047 B2
(45) Date of Patent: Dec. 11, 2012

(54) METHOD FOR PRODUCING LIQUID DISCHARGE HEAD

(75) Inventors: Tadanobu Nagami, Yamato (JP); Junichi Kobayashi, Ayase (JP); Takeshi Terada, Tama (JP); Makoto Watanabe, Yokohama (JP); Hiroyuki Abo, Tokyo (JP); Mitsunori Toshishige, Kawasaki (JP); Yoshinori Tagawa, Yokohama (JP); Shuji Koyama, Kawasaki (JP); Kenji Fujii, Hiratsuka (JP); Masaki Ohsumi, Yokosuka (JP); Jun Yamamuro, Yokohama (JP); Hiroyuki Murayama, Kawasaki (JP); Yoshinobu Urayama, Fujisawa (JP); Taichi Yonemoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 12/635,083

(22) Filed: Dec. 10, 2009

(65) Prior Publication Data

US 2010/0147793 A1 Jun. 17, 2010

(30) Foreign Application Priority Data

Dec. 16, 2008 (JP) ................................. 2008-319720

(51) Int. Cl.
*G01D 15/00* (2006.01)

(52) U.S. Cl. .............. 216/27; 29/890.1; 427/555; 216/2

(58) Field of Classification Search ......................... None
See application file for complete search history.

(56) References Cited

U.S. PATENT DOCUMENTS

| | | | | |
|---|---|---|---|---|
| 4,475,113 A * | 10/1984 | Lee et al. | ........................ | 347/47 |
| 6,287,885 B1 * | 9/2001 | Muto et al. | ...................... | 438/48 |
| 2006/0191862 A1 * | 8/2006 | Hayakawa et al. | ............. | 216/27 |
| 2007/0289942 A1 * | 12/2007 | Fujii et al. | ....................... | 216/27 |
| 2008/0088674 A1 * | 4/2008 | Hayakawa | ...................... | 347/54 |

FOREIGN PATENT DOCUMENTS

| | | | |
|---|---|---|---|
| JP | 2005-169993 A | | 6/2005 |
| JP | 2005169993 A | * | 6/2005 |

OTHER PUBLICATIONS

Ted J. Hubbard, MEMs Desing: The Geometry of Silicon Micromachining, 1994, California Institute of Technology, p. 1-182.*

JPO, Machine Translation of JP2005169993, Sep. 10, 2012, JPO.*

* cited by examiner

*Primary Examiner* — Binh X Tran
*Assistant Examiner* — David Cathey, Jr.
(74) *Attorney, Agent, or Firm* — Canon U.S.A., Inc., IP Division

(57) ABSTRACT

The present invention provides a method for producing a liquid discharge head including a silicon substrate having, on a first surface, energy generating elements, and a supply port penetrating the substrate from the first surface to a second surface, which is a rear surface of the first surface of the substrate. The method includes the steps of: preparing the silicon substrate having a sacrifice layer at a portion on the first surface where the ink supply port is to be formed and an etching mask layer having a plurality of openings on the second surface, the volume of a portion of the sacrifice layer at a position corresponding to a portion between two adjacent said openings being smaller than the volume of a portion of the sacrifice layer at a position corresponding to the opening; etching the silicon substrate from the plurality of openings and etching the sacrifice layer.

7 Claims, 9 Drawing Sheets

FIG. 2B−1
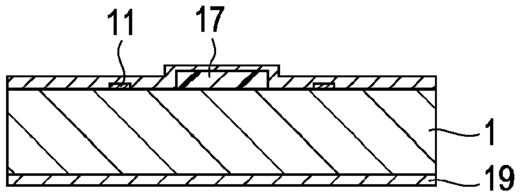
FIG. 2B−2
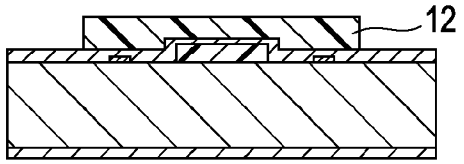
FIG. 2B−3
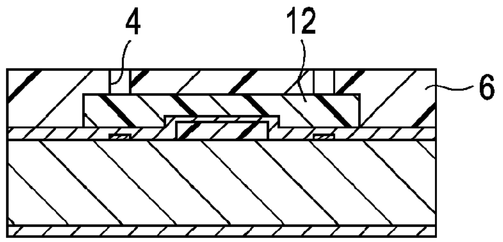
FIG. 2B−4
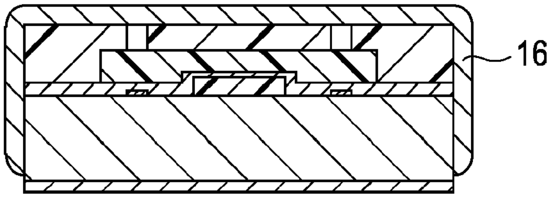
FIG. 2B−5
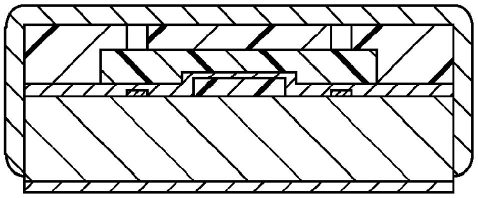
FIG. 2B−6
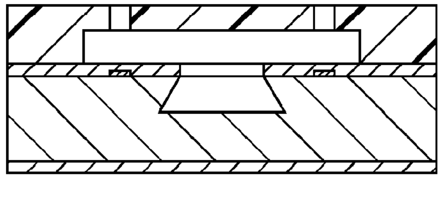

METHOD FOR PRODUCING LIQUID DISCHARGE HEAD

BACKGROUND OF THE INVENTION

1. Field of the Invention

The present invention relates to a method for producing liquid discharge heads that discharge liquid and, more specifically, it relates to a method for producing ink jet recording heads that discharge recording liquid droplets used in an ink jet recording method.

2. Description of the Related Art

Examples of liquid discharge heads for discharging liquid include ink jet recording heads used in an ink jet recording method, which discharge ink onto recording media to perform recording.

An ink jet recording head (recording head) includes a substrate that has, at least, a plurality of discharge ports through which ink is discharged, an ink flow path communicating with the respective discharge ports, a supply port for supplying the flow paths with ink, and discharge-energy-generating elements for applying discharge energy to the ink in the flow paths. Typically, a silicon (Si) substrate is used as a substrate, and an ink supply port communicating with an ink flow path is formed so as to penetrate the substrate.

Japanese Patent Laid-Open No. 2005-169993 discloses a method for producing an ink jet recording head that has a beam formed at an ink supply port to increase the mechanical strength of a silicon substrate. In this method, a first mask 7 having two openings is formed on a rear surface of the silicon substrate, and dry etching is performed through the two openings obliquely with respect to the rear surface of the silicon substrate to form two grooves. Thereafter, crystal anisotropic etching is performed through the grooves toward the substrate surface to form an ink supply port 10, and a portion left unetched between the grooves in the rear surface of the substrate constitutes the beam.

However, in the above-described method, anisotropic etching has to be performed after oblique etching is performed twice. That is, oblique etching (dry etching), mask formation, and anisotropic etching for allowing the grooves to penetrate to the ink supply port surface have to be performed. Therefore, the number of steps is large, which imposes a heavy burden on the manufacture thereof.

SUMMARY OF THE INVENTION

The present invention has been made in view of the above-described problems, and it provides a method for manufacturing an ink jet recording head having a beam in a supply port by a simple method.

The present invention provides a method for producing a liquid discharge head including a silicon substrate having, on a first surface, energy generating elements configured to generate energy for discharging liquid from discharge ports, and a supply port penetrating the substrate from the first surface to a second surface, which is a rear surface of the first surface of the substrate, the supply port being configured to supply liquid to the energy generating elements. The method includes the steps of: preparing the silicon substrate having a sacrifice layer that is in contact with a portion of the first surface where the ink supply port is to be formed and is composed of a material capable of being isotropically etched by an alkaline solution, and an etching mask layer having a plurality of openings on the second surface, the volume of a portion of the sacrifice layer at a position corresponding to a portion between two adjacent said openings being smaller than the volume of a portion of the sacrifice layer at a position corresponding to the opening; exposing the sacrifice layer by performing crystal anisotropic etching on the silicon substrate from the plurality of openings with the alkaline solution; and etching the sacrifice layer with the alkaline solution.

The present invention enables ink jet recording heads having a beam in a supply port to be produced with ease.

Further features of the present invention will become apparent from the following description of exemplary embodiments with reference to the attached drawings.

BRIEF DESCRIPTION OF THE DRAWINGS

FIGS. 2A-1 to 2B-6 are views showing a process of forming ink supply ports according to the first embodiment.

FIG. 4 is a perspective view showing the shape of a sacrifice layer according to the first embodiment.

FIG. 5 is a perspective view showing the shape of a sacrifice layer according to a second embodiment.

DESCRIPTION OF THE EMBODIMENTS

Embodiments of the present invention will be described in detail below with reference to the attached drawings. Note that the present invention is not limited to the following embodiments. The following descriptions will be given taking an ink jet recording head as an example of a liquid discharge head. However, the liquid discharge head is not limited to the ink jet recording head, and it may be used in forming circuit substrates and color filters.

Figures 1A, 1B, 1C, 1D:
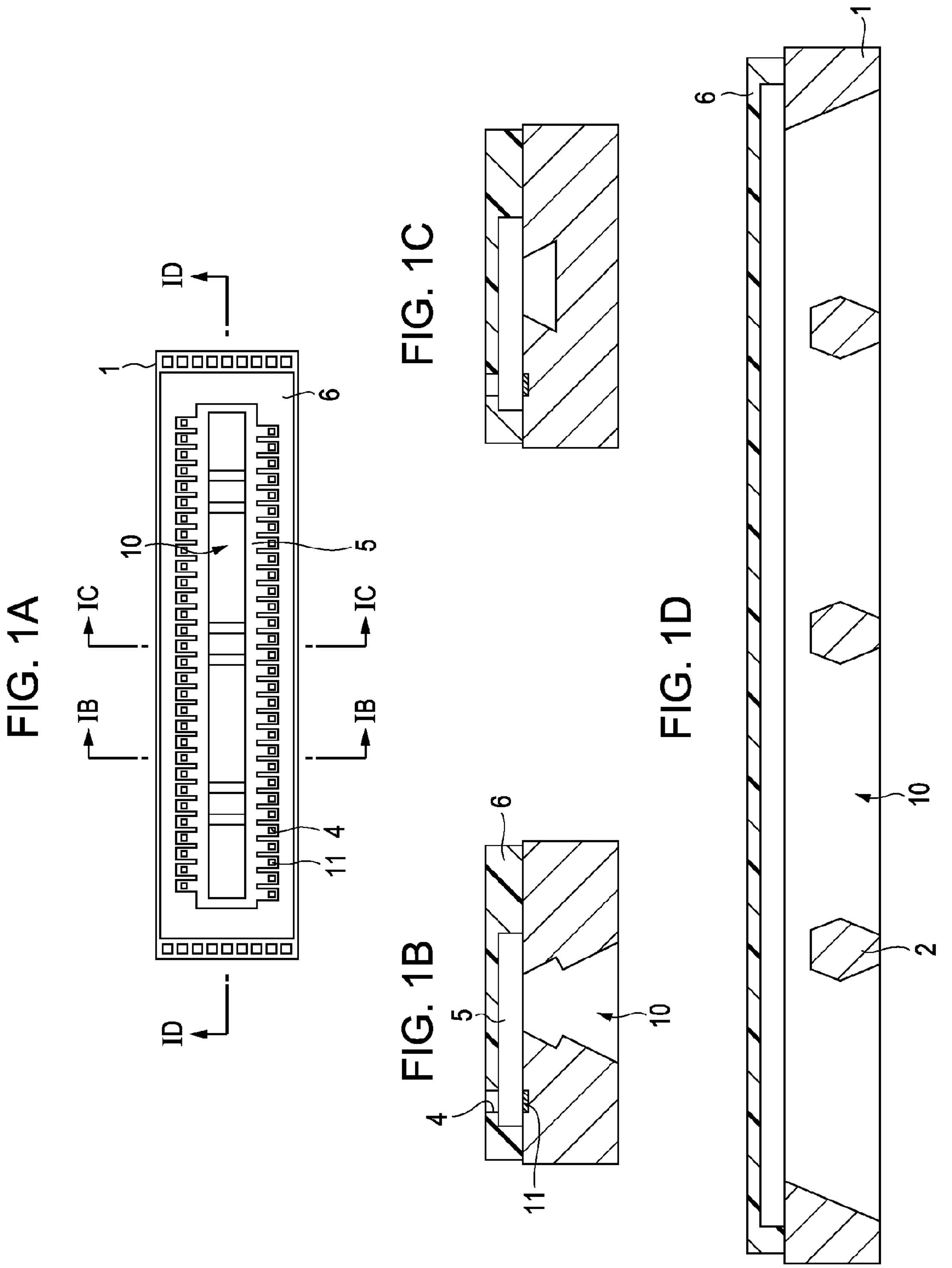
FIGS. 1A to 1D are schematic views of an ink jet recording head formed by a manufacturing method according to a first embodiment.

FIGS. 1A to 1D are schematic views of an ink jet recording head formed by a manufacturing method according to a first embodiment. FIG. 1A is a schematic plan view of the ink jet recording head according to this embodiment. FIG. 1B is a schematic cross-sectional view taken along line IB-IB in FIG. 1A. FIG. 1C is a schematic cross-sectional view taken along line IC-IC in FIG. 1A. FIG. 1D is a schematic cross-sectional view taken along line ID-ID in FIG. 1A. Note that, herein, an "extending direction" means a direction in which beams are formed, and a "middle portion in the extending direction" means a portion corresponding to line IC-IC.

The ink jet recording head according to this embodiment has a silicon substrate 1 having a plurality of discharge-energy-generating elements 11 and a covering resin layer 6 positioned and fixed thereto. The covering resin layer 6 has discharge ports 4, through which ink serving as liquid is discharged, at positions corresponding to the respective discharge-energy-generating elements 11 and part of ink flow paths 5 communicating with a common liquid chamber (not shown).

The silicon substrate 1 has a crystal orientation of <100> and has a plurality of ink supply ports 10 formed along discharge port rows at a middle portion of the silicon substrate 1. Beams 2, which are part of the silicon substrate 1, are formed in the ink supply ports 10. The beams 2 are structures for increasing the mechanical strength of the silicon substrate 1 and are formed by leaving portions of the silicon substrate 1 unetched when the ink supply ports 10 are formed by anisotropic etching. Accordingly, the beams 2 are made of the same material as the silicon substrate 1.

For the simplicity's sake, FIGS. 1A to 1D show the ink jet recording head having three beams 2 in the ink supply ports 10. However, the number of beams 2 can be appropriately selected according to the shape of the silicon substrate 1 or the intended mechanical strength. In the ink jet recording head according to this embodiment, as shown in FIG. 1D, because the top surfaces of the beams 2 are lower than (formed inward of) the surface of the silicon substrate 1, the ink supply ports 10 are not divided by the beams 2 on the surface side of the silicon substrate 1. Therefore, although the beams 2 are formed, an ink supply from the ink supply ports 10 to the respective ink flow paths 5 is properly performed.

In the ink jet recording head formed by the manufacturing method according to this embodiment, because the mechanical strength of the silicon substrate 1 is increased, the silicon substrate 1 is less likely to be deformed in a head having substantially one long ink supply port. Furthermore, because the beams 2 can be formed simultaneously with the ink supply ports 10 from the same material as the silicon substrate 1, no special step or special reinforcing member is needed.

A method for producing ink jet recording heads according to this embodiment will be described with reference to FIGS. 2A-1 to 2B-6, 3A to 3D, and 4.

Figures 1, 2A:
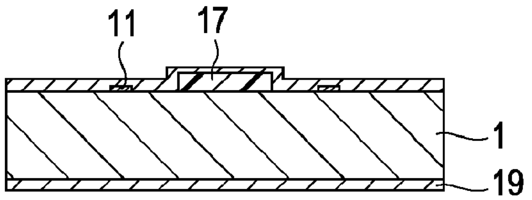
Figures 2, 2A:
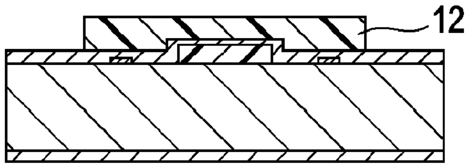
Figures 2, 2A, 3:
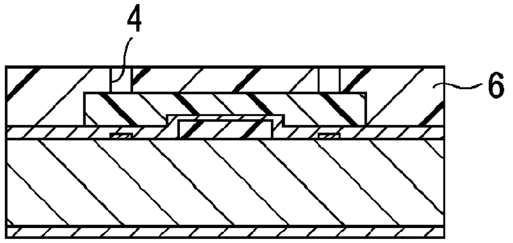
Figures 2, 2A, 3, 4:
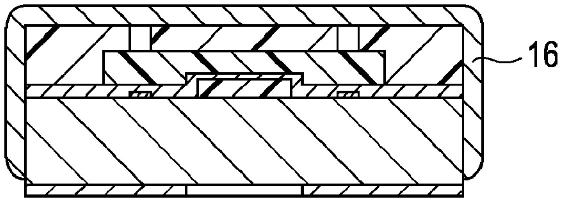

FIGS. 2A-1 to 2A-6 are cross-sectional views showing a process of forming the ink supply ports 10 shown in FIG. 1B. FIGS. 2B-1 to 2B-6 are cross-sectional views showing a process of forming the beam 2 shown in FIG. 1C. FIGS. 3A to 3D are cross-sectional views showing an anisotropic etching process at the cross section shown in FIG. 1D. In FIGS. 3A to 3D, only the silicon substrate 1, a sacrifice layer 17, and an etching mask 19 on the bottom surface are shown. FIG. 4 is a perspective view showing the shape of the sacrifice layer 17 (FIG. 3A) according to this embodiment.

Figure 3A:
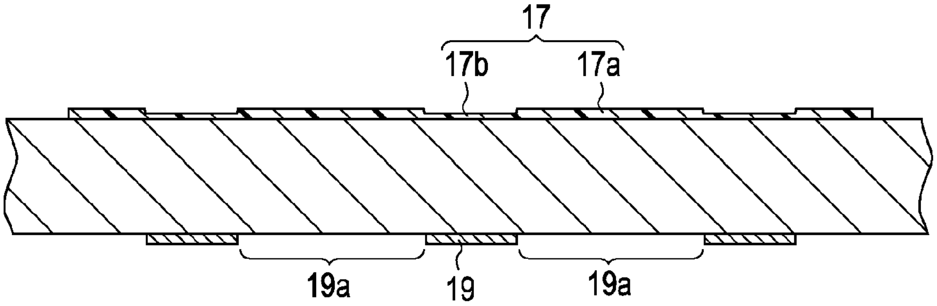
FIGS. 3A to 3D are views showing a process of forming the ink supply ports according to the first embodiment.

First, as shown in FIGS. 2A-1 and 2B-1, the silicon substrate 1 having a crystal orientation of <100> is prepared, and a plurality of discharge-energy-generating elements 11 are formed on the surface of the silicon substrate 1. Then, the sacrifice layer 17 for forming the ink supply ports 10 and the beams 2 are formed. At this time, as shown in FIGS. 3A and 4, the sacrifice layer 17 is formed such that the volume of a portion 17*b* corresponding to a portion between two adjacent openings 19*a* in the etching mask 19 is smaller than the volume of a portion 17*a* corresponding to an opening 19*a*. The sacrifice layer 17 may be made of any material as long as it can be etched by an alkaline solution, and examples of the material thereof include aluminum and polysilicon. Furthermore, it may be made of an aluminum compound, such as aluminum silicon, aluminum copper, or aluminum silicon copper.

The etching mask 19 required in an anisotropic etching process (described below) is formed on the rear surface of the silicon substrate 1. The etching mask 19 is desirably made of a thermally-oxidized film formed in a thermal oxidation process in a semiconductor manufacturing process, a silicon nitride (SiN) film formed by plasma chemical vapor deposition (CVD), or the like. The etching mask 19 is not limited to a thermally-oxidized film or a SiN film, and, as long as it can resist an anisotropic etchant (for example, resist etc.), it is not specifically limited. The method for forming the etching mask 19 is not specifically limited either.

Next, as shown in FIGS. 2A-2 and 2B-2, a flow-path forming layer 12 made of a soluble resin material, serving as a mold for forming the ink flow paths 5, is applied to the surface of the silicon substrate 1 and is patterned into the shape of the ink flow paths 5.

Then, as shown in FIGS. 2A-3 and 2B-3, the covering resin layer 6 is formed on the surface of the silicon substrate 1 so as to cover the flow-path forming layer 12. Furthermore, the ink discharge ports 4 are formed. The covering resin layer 6 may be made of a photosensitive material.

Next, as shown in FIGS. 2A-4 and 2B-4, the etching mask 19 on portions corresponding to the ink supply ports 10 is removed. Because the shape of the opening defines the shape of the ink supply ports 10 and the shape of the bottom surfaces of the beams 2 on the rear surface side of the silicon substrate 1, it has to be formed as such. As shown in FIG. 3A, the etching mask 19 is patterned such that the etching mask 19 is left at portions on the rear surface of the silicon substrate 1 corresponding to the lower surfaces of beam forming portions.

By making the width of the etching mask 19 under the beam forming portions in the direction perpendicular to the extending direction at least twice the etching amount of the silicon substrate 1 in the transverse direction, the bottom surfaces of the beams 2 can be positioned at the same level as the bottom surfaces of the openings of the ink discharge ports. For example, when the silicon substrate 1 having a thickness of 625 μm is etched by a 22 weight percent solution of tetramethyl ammonium hydroxide (TMAH) at 80° C., in order to leave the bottom surfaces of the beams 2 on the same surface as the rear surface of the substrate 1, it is desirable that the etching mask 19 between the openings, i.e., below the beam forming portions, have a width of about 170 μm or more. Although this is not specifically limited, this is because etching of the <111> plane progresses by about 85 μm on each side of the edges of the etching mask 19 on the rear surface side of the substrate 1, while etching of the <100> plane starting from the rear surface of the silicon substrate 1 reaches the surface side of the substrate 1. In contrast, by making the width of the beam forming portions in the direction perpendicular to the extending direction less than twice the etching amount of the silicon substrate 1 in the transverse direction, the bottom surfaces of the beams 2 can be positioned above the bottom surfaces of the openings of the ink discharge ports.

Then, the silicon substrate 1 is covered by a protection member 16 so that the respective members provided on the silicon substrate 1 are not damaged by an alkaline solution in the anisotropic etching process described below.

Next, as shown in FIGS. 2A-5 and 2B-5, using the etching mask (for example, a thermally-oxidized film) 19 as the mask, anisotropic etching with an alkaline solution is performed to partially remove the silicon substrate 1. Herein, because the silicon substrate 1 is the <100> plane, as shown in FIG. 2A-5, the silicon substrate 1 is etched in the shape of a quadrangular pyramid trapezoid tapered toward the upper surface. On the other hand, in FIG. 2B-5, because the etching mask 19 has no opening at the corresponding position, the silicon substrate 1 is not etched from the rear surface side (see FIG. 3B).

When the etching progresses further, the sacrifice layer 17 on the surface of the substrate 1 starts to be removed. At this time, because the sacrifice layer 17 has a higher etching rate than the silicon substrate 1, the sacrifice layer 17 is preferentially etched. A portion where the sacrifice layer 17 is thick allows more etchant to penetrate therethrough and has a high etching rate. Accordingly, as shown in FIG. 4, because the volume of the sacrifice layer 17*b* corresponding to portions where the beams 2 are to be formed (the sacrifice layer above the beam forming portions on the surface of the silicon substrate 1) is smaller than the volume of the sacrifice layer 17*a* corresponding to the penetrating portions of the ink supply ports 10, etching progresses slower at the sacrifice layer 17*b* than at the sacrifice layer 17*a*. In other words, because the thickness of the portion 17*b* of the sacrifice layer 17 corresponding to the portion between two adjacent openings 19*a* in the etching mask 19 is smaller than the thickness of the portion 17*a* corresponding to the opening 19*a*, etching progresses slower at the sacrifice layer 17*b* than the sacrifice layer 17*a*.

Although the etching rate is adjusted by changing the thickness of the sacrifice layer 17 in this embodiment, the etching rate can also be adjusted by changing the material of the sacrifice layer 17. For example, it is possible that a sacrifice layer composed of aluminum is formed at the penetrating portions of the ink supply ports (portions corresponding to the openings 19*a*) and a sacrifice layer composed of polysilicon, which has a lower etching rate than aluminum, is formed at the beam portions (portions corresponding to the portions between the openings 19*a*).

Figures 2, 2A, 3, 4, 5:
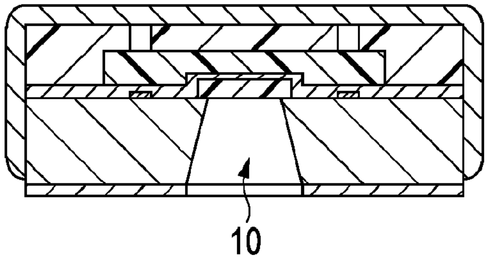
Figures 2, 2A, 3, 4, 5, 6:
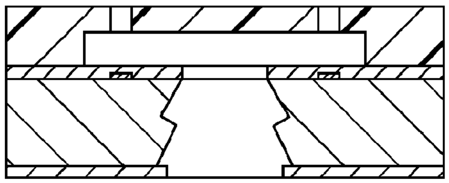
Figure 3B:
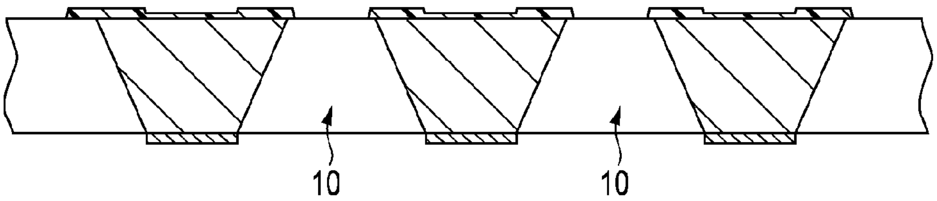
Figure 3C:
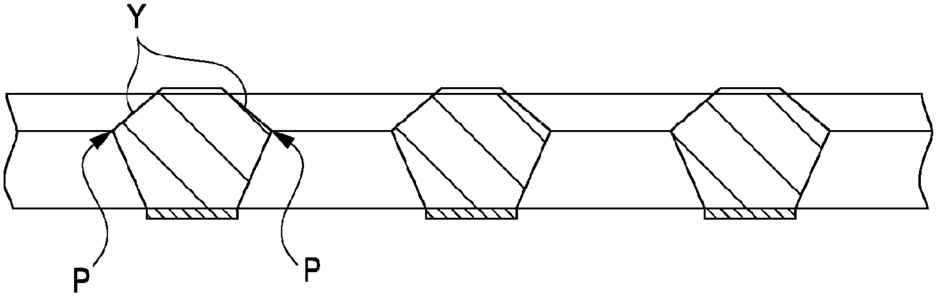

After the space formed after the sacrifice layer 17 has been removed is filled with an etchant, such as an alkaline solution, etching progresses from the surface side toward the rear surface side of the silicon substrate 1, as shown in FIGS. 2A-6, 2B-6, and 3C. Thus, surfaces forming 54.7°, parallel to the etching surfaces from the rear surface side, are formed. On the other hand, in the cross section shown in FIG. 2B-6, only etching from the surface side of the substrate 1 is performed, and the extent of the progress of the etching is the same as that shown in the cross section of FIG. 2A-6. Furthermore, in FIG. 3C, due to the difference in etching rate of the sacrifice layer 17, the beams 2 each form different surfaces, i.e., the surfaces etched from the surface side of the silicon substrate 1 (immediately below the portions where the sacrifice layer 17 is thick, i.e., portions Y in FIG. 3C) and the top surface thereof. FIGS. 3B and 3C will be described in detail. The etchant having reached the top surface of the substrate 1 etches the thick portions of the sacrifice layer 17 positioned above both ends of the beams 2 from both sides (the left and right sides in FIGS. 3B and 3C), and, at the same time, etches the upper ends (the left and right ends in FIGS. 3B and 3C) of the beams 2. At this time, because the thin portions of the sacrifice layer 17 between the thick portions have a low etching rate, the upper ends of the beams 2 can be etched while leaving the sacrifice layer 17. Then, in FIG. 3D, the remaining sacrifice layer 17 is etched, whereby the top surfaces of the beams 2 are slightly etched.

Note that the depth of the top surfaces of the beams 2 can be controlled by the width and etching time of the sacrifice layer 17 provided on the top surfaces of the beams 2 having a low etching rate.

Figure 3D:
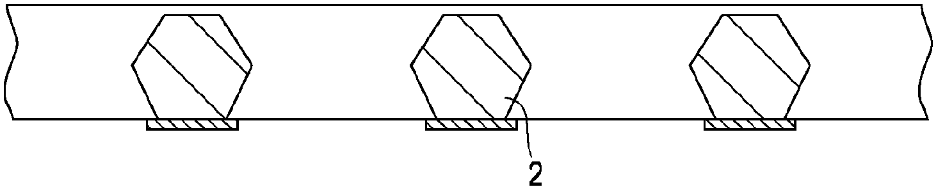
Figure 4:
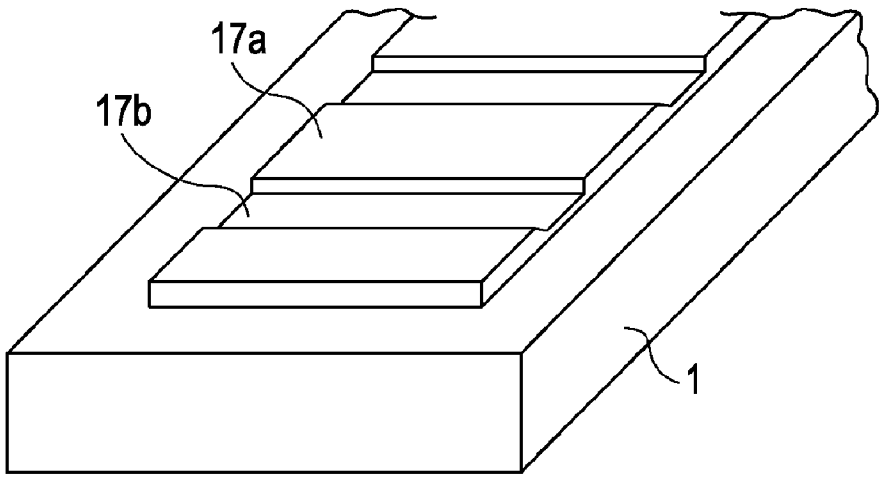
Figure 5:
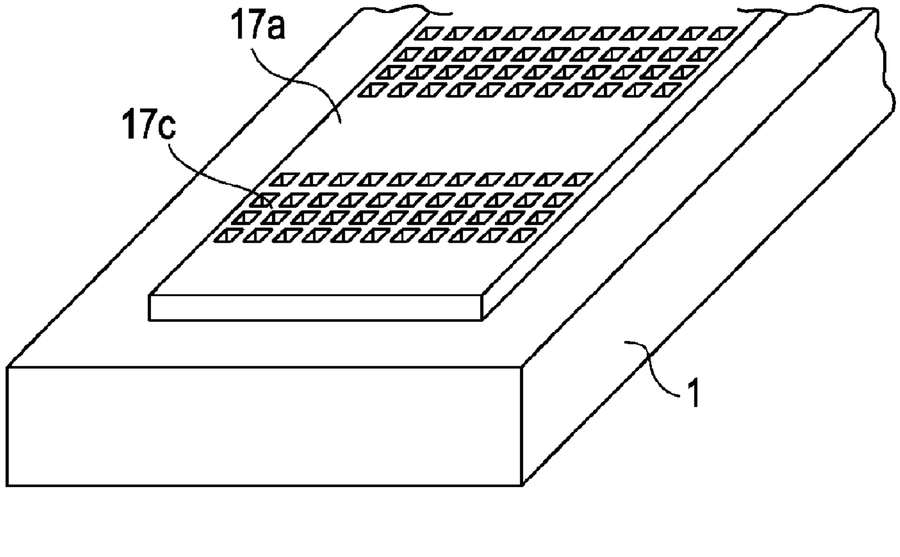

When etching is further continued, because the etching rate at points P, where the etching surfaces from the rear surface side of the substrate 1 and the etching surfaces from the surface side of the substrate 1 meet, is higher than the etching rate at the top surfaces of the beams 2, the beams 2 finally become as shown in FIG. 3D. At this stage, the crystal anisotropic etching is finished.

Thereafter, by eluting the flow-path forming layer 12, the ink jet recording head is fabricated.

In the first embodiment, as described above, by differentiating the thicknesses and materials of the sacrifice layer 17*a* corresponding to the penetrating portions of the ink supply ports 10 and the sacrifice layer 17*b* corresponding to the beam forming portions, the etching rates of the sacrifice layers 17*a* and 17*b* can be controlled. In contrast, in a second embodiment, a sacrifice layer 17*c* corresponding to the beam forming portions is designed such that the volume thereof is smaller than that of the sacrifice layer 17*a*. A method for achieving an etching rate different from the etching rate of the sacrifice layer 17*a* corresponding to the penetrating portions of the ink supply ports 10 will be described.

The shape of the sacrifice layer 17 will be described below. Because the structure other than the shape of the sacrifice layer 17 is the same as that according to the first embodiment, a description thereof will be omitted.

FIG. 5 shows, similarly to FIG. 4, only the silicon substrate 1 and the sacrifice layer 17. In FIG. 5, because the sacrifice layer 17*c* on the area corresponding to the beam forming portion is formed in a mesh shape, etching of the <100> plane from the surface side of the silicon substrate 1 does not progress uniformly on the same surface. However, by reducing the distance between the cells of the mesh where the sacrifice layer 17 is not disposed, the silicon substrate 1 below the mesh portions is removed by transverse etching from four directions, via the sacrifice layer 17. Accordingly, as a result, the top surfaces of the beams 2 lower than the surface of the substrate 1 are formed. In this embodiment, because patterning of the sacrifice layer 17 is completed in one step, compared to the first embodiment, the number of steps is small.

In this embodiment, although the sacrifice layer 17 on the beam forming portions is removed in a mesh shape, the shape is not limited thereto. The sacrifice layer 17 may have any shape as long as it can be removed by transverse etching within an anisotropic etching time (for example, a dot shape).

FIGS. 6A to 6D are views showing the manufacturing process according to a third embodiment, corresponding to FIGS. 3A to 3D of the first embodiment.

In the silicon substrate 1 according to this embodiment, only the sacrifice layer 17 according to the first embodiment is changed. Because the other structures are the same as that according to the first embodiment, descriptions thereof will be omitted.

Figure 6A:
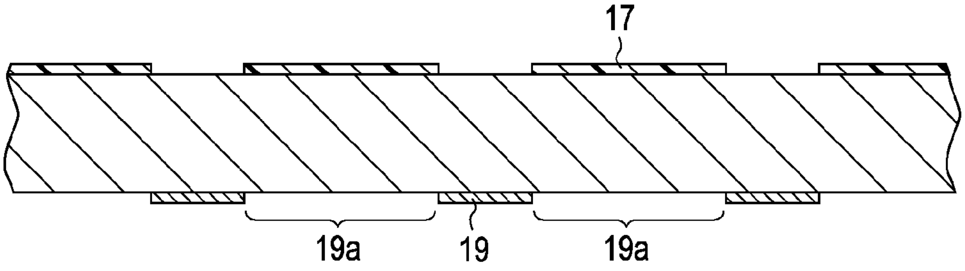
FIGS. 6A to 6D are cross-sectional views showing a process of a manufacturing method according to a third embodiment.

The beams 2 according to this embodiment are different from those formed in the first and fourth embodiments in that the top surfaces thereof and the surface of the silicon substrate 1 lie in the same plane. To make the top surfaces of the beams 2 and the surface of the silicon substrate 1 lie in the same plane, as shown in FIG. 6A, no sacrifice layer 17 is disposed on the substrate 1, at portions corresponding to the beam forming portions. More specifically, in FIG. 6A, the sacrifice layer 17 on the surface of the silicon substrate 1 is disposed at positions corresponding to the openings 19*a* in the etching mask 19, not disposed at positions corresponding to the portions between the adjacent openings 19*a* in the etching mask 19.

In this embodiment, although not specifically limited, the width without the sacrifice layer 17 may be, for example, about 300 μm. The ink-supply performance, which needs to be improved, can be significantly improved.

Figure 6B:
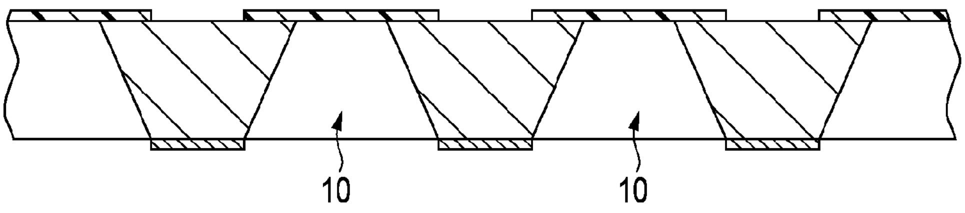

FIG. 6B shows a state in which anisotropic etching from the rear surface side of the silicon substrate 1 has reached the surface of the silicon substrate 1, similarly to the first and second embodiments.

Figure 6C:
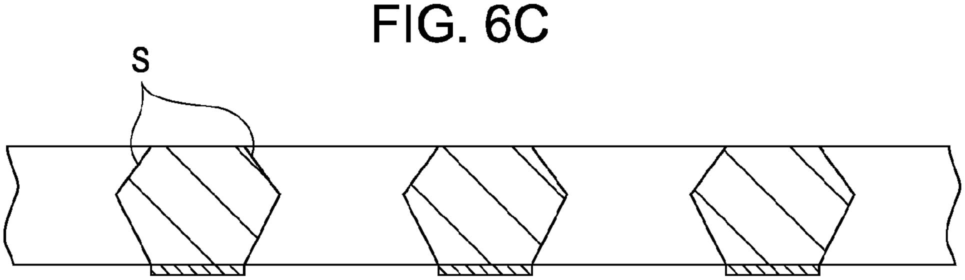

Next, as shown in FIG. 6C, when etching further progresses, the sacrifice layer 17 is etched and the silicon substrate 1 below the sacrifice layer 17 is etched (in FIG. 6C, portions S). When the sacrifice layer 17 disposed on the surface of the silicon substrate 1 is completely etched, the etching rate of the top surfaces of the beams 2 in the transverse direction drastically decreases. As a result, etching progresses much faster at the portions S (FIG. 6C) than at the top and bottom surfaces of the beams 2 in the transverse direction.

Figure 6D:
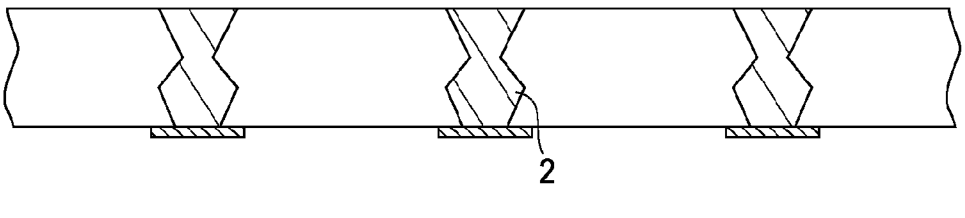

Then, as shown in FIG. 6D, the portions S, which are the etching surfaces from the surface side of the silicon substrate 1, are etched. Thus, finally, the crystal anisotropic etching is completed leaving the beams 2.

Thus, in an ink jet recording head manufactured by the manufacturing method according to this embodiment, although a rib structure is employed, ribs at portions corresponding to the top surfaces of the beams 2 are partially removed. This improves the mechanical strength while preventing lowering of the ink supply performance.

In a fourth embodiment, an etching mask and a sacrifice layer are formed, and the silicon substrate 1 is anisotropically etched to form the ink supply port 10 and the beam 2 having a diamond-shaped cross section in the middle between the top and bottom surfaces of the opening of the ink supply port 10.

With the method for producing ink jet recording heads according to this embodiment, the beam 2 having a diamond-shaped cross section in the extending direction can be formed in the middle between the top and bottom surfaces of the opening of the ink supply port 10. All the surfaces of the beam 2 are composed of the crystal orientation planes <111>. In addition, because the beam 2 can be formed merely by anisotropic etching, the number of steps, as well as the cost of equipment, can be reduced.

Furthermore, with the method for producing ink jet recording heads of the present invention, deformation of the ink jet recording heads is prevented. This prevents positional misalignment of the ink discharge ports and enables the ink jet recording heads to be formed in an elongated shape. Thus, high-resolution, high-speed recording becomes possible. Moreover, because damages in the manufacturing process are prevented, the manufacturing yield is improved. In addition, in this embodiment, because the beam 2 is formed in the middle between the top and bottom surfaces of the opening of the ink supply port 10, the top surface of the ink supply port 10 can be completely opened. Therefore, a problem related to an ink-refilling time can be prevented, and the cycle characteristics of discharge can be made uniform. Thus, high-speed recording can be achieved.

Referring to the attached drawings, this embodiment will be described below.

Figure 7A:
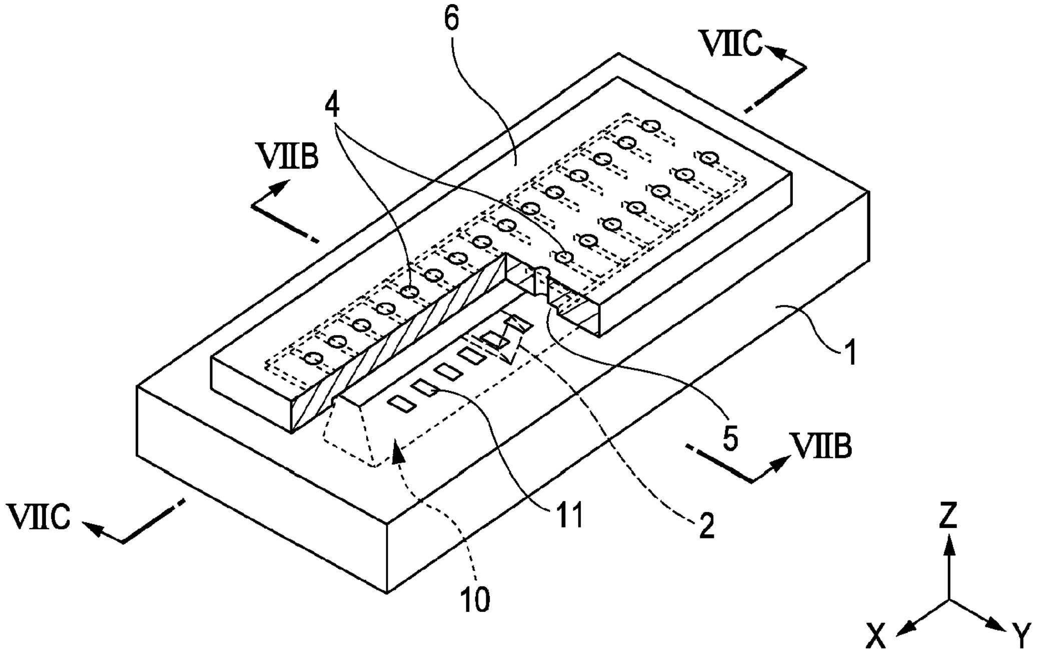
FIGS. 7A to 7C are views showing an example of an ink jet recording head formed by a manufacturing method according to a fourth embodiment.
Figure 7B:
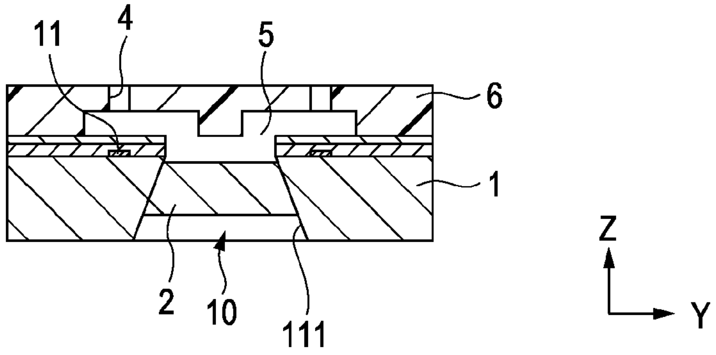
Figure 7C:
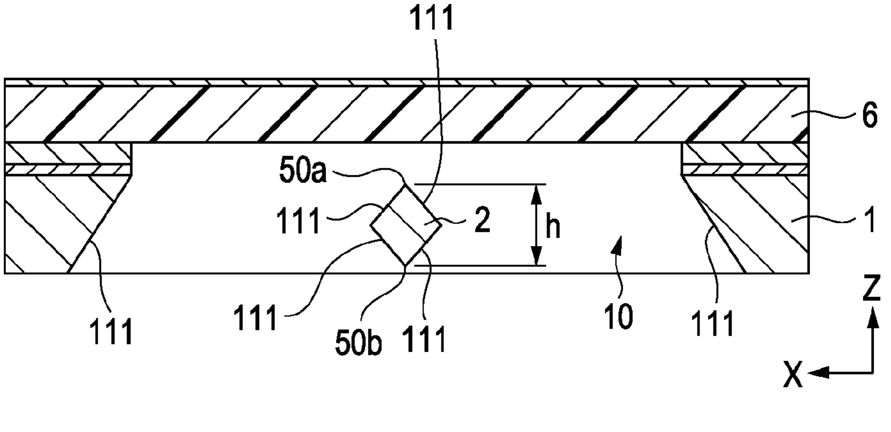
Figure 8A:
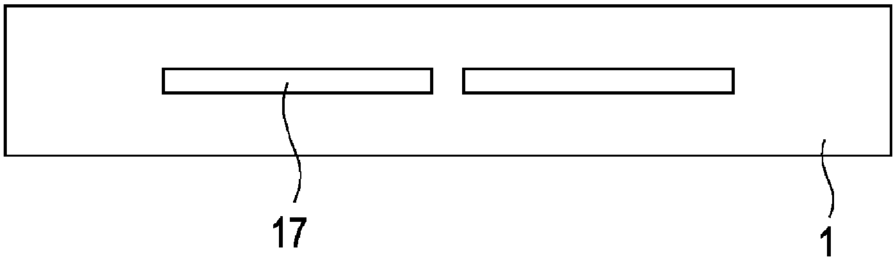
FIGS. 8A to 8C are views showing the manufacturing method according to the fourth embodiment.
Figure 8B:
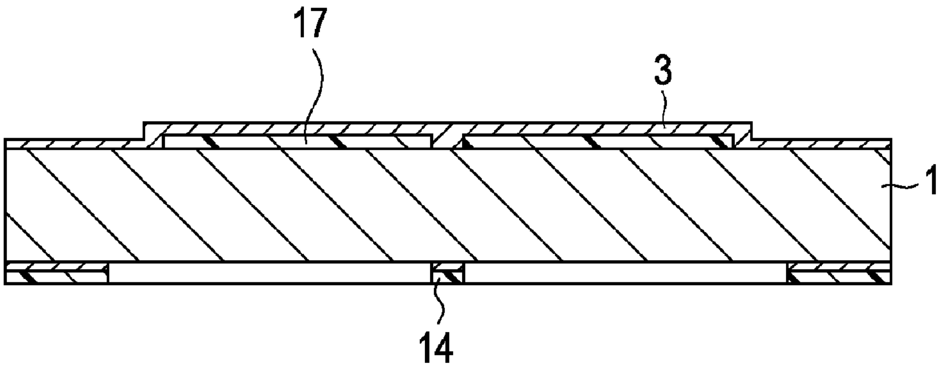
Figure 8C:
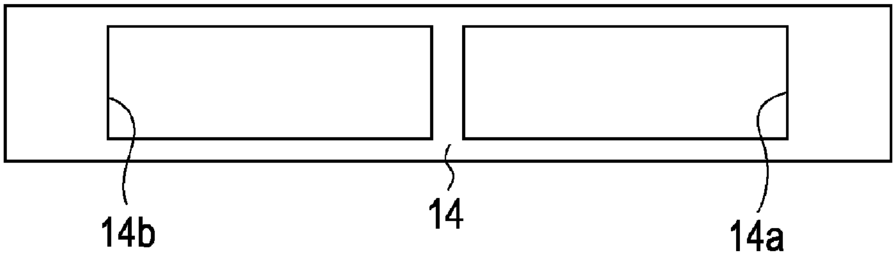

FIG. 7A is a perspective view showing an example of the ink jet recording head according to this embodiment. FIG. 7B is a cross-sectional view of the ink jet recording head in FIG. 7A, taken along line VIIB-VIIB in FIG. 7A. FIG. 7C is a cross-sectional view taken along line VIIC-VIIC in FIG. 7A.

First, the structure of the ink jet recording head manufactured according to this embodiment will be described with reference to FIGS. 7A to 7C and 8A to 8C.

As shown in FIGS. 7A to 7C, the ink jet recording head according to this embodiment includes the silicon substrate 1 made of a silicon single crystal <100> and the covering resin layer 6 having the plurality of ink discharge ports 4 and bonded to the silicon substrate 1. The silicon substrate 1 has the ink supply port 10, and the beam 2 is formed in the middle between the top and bottom surfaces of the opening of the ink supply port 10. That is, the beam 2 is formed such that it does not touch the top surface or bottom surface of the opening of the ink supply port 10. The structures of the beam 2 formed in the silicon substrate 1 and the peripheral portions will be described in detail.

As shown in FIG. 7C, the ink supply port 10 is formed to penetrate the silicon substrate 1. The side surfaces of the ink supply port 10, made of the silicon substrate 1, have an angle such that the crystal orientation planes <111> are exposed from the opening on the rear surface side of the silicon substrate 1. Thus, the crystal orientation planes <111> that are continuous from the opening on the rear surface side to the opening on the surface side of the silicon substrate 1 are formed.

The beam 2 is a structure for reinforcing the entirety of the silicon substrate 1. As shown in FIGS. 7B and 7C, the beam 2 has a diamond-shaped cross section and is formed in the middle between the top and bottom surfaces of the opening of the ink supply port 10. Although the number of beams 2 is not specifically limited, the ink jet recording head shown has one beam 2. The beam 2 is formed by anisotropically etching the silicon substrate 1 such that it extends parallel to the surface of the silicon substrate 1, i.e., in the Y direction in the figures. All the four surfaces of the diamond-shaped cross section face the inside of the ink supply port 10, and the crystal orientation planes thereof are <111>. As shown in FIG. 7C, the height h of the beam 2, i.e., the dimension of the beam 2 in the thickness direction of the silicon substrate 1 (Z direction in the figures) is smaller than the thickness of the silicon substrate 1. Thus, the spaces above and below the beam 2 constitute part of the ink supply port 10, and both the surface side and the rear surface side of the silicon substrate 1 are open.

The above-described ink jet recording head manufactured according to this embodiment has the beam 2, whose crystal orientation planes are <111>, in the middle between the top and bottom surfaces of the opening of the ink supply port 10. Thus, the mechanical strength is obtained. Accordingly, for example, even if the ink supply port 10 is formed in an elongated shape, deformation of the silicon substrate 1 is prevented by the beam 2. As a result, positional misalignment of the ink discharge ports 4 due to deformation of the silicon substrate 1 can be prevented. Furthermore, because all the surfaces to be in contact with ink are the crystal orientation planes <111>, the silicon substrate 1 can be prevented from being dissolved by alkaline ink.

Furthermore, it is desirable that the height of the beam 2 be larger than half the thickness of the silicon substrate 1 (that is, the height of the ink supply port 10), from the standpoint of further improving the mechanical strength.

Next, the method for producing ink jet recording heads according to this embodiment will be described in more detail. In particular, anisotropic etching processing for forming the beam 2, in which all the four surfaces are composed of the crystal orientation planes <111>, will be described in detail.

First, anisotropic etching for forming the ink supply port 10 and the beam 2 starts from the opening in the etching mask formed on the rear surface of the silicon substrate 1. The crystal orientation plane <100> is etched until the silicon substrate 1 is penetrated to the surface (until the etching has reached the sacrifice layer 17). At this time, an etching mask 14 (FIG. 8C) formed on the rear surface of the silicon substrate 1 allows two surfaces of the diamond-shaped beam 2 on both sides of a lower apex 50*b* to form the crystal orientation planes <111>. The etching mask 14 is formed such that the etching mask remains at least at a portion on the rear surface of the silicon substrate 1, corresponding to below the beam forming portion (between openings 14*a* and 14*b*). Furthermore, no sacrifice layer 17 is disposed at a position corresponding to the etching mask 14 provided between the openings 14*a* and 14*b*.

Next, etching is further continued to dissolve the sacrifice layer 17. When the etching is further continued, the etchant enters from the portion where the sacrifice layer 17 has been dissolved. As a result, anisotropic etching progresses from the surface of the silicon substrate 1, and two surfaces of the beam 2 on both sides of the upper apex 50*a* form the crystal orientation planes <111>. Herein, the sacrifice layer 17 extends over the top surfaces of the openings in the silicon substrate 1, formed when anisotropic etching has reached the sacrifice layer 17, and extends therefrom toward above the beam forming portion (see FIG. 9A). Furthermore, the sacrifice layer 17 extends to an area except above the middle portion of the beam forming portion in the extending direction, on the surface of the silicon substrate 1, at a portion above the beam forming portion (see FIG. 8A).

The maximum dimension from the upper apex 50*a* to the lower apex 50*b* of the beam 2, i.e., the height h of the beam 2 (see FIG. 7C), may be almost equal to the thickness of the silicon substrate 1. Because the crystal orientation planes <111> formed by anisotropic etching are formed at a certain angle (54.7 degrees), the beam 2 has a diamond shape elongated in the thickness direction of the silicon substrate 1.

Herein, the position of the upper apex 50*a* of the beam 2 can be controlled by the processing time of anisotropic etching and the pattern of the sacrifice layer 17. That is, it can be restricted by the etching time from when the anisotropic etching starts from the rear surface of the silicon substrate 1 to when the silicon substrate 1 is penetrated to the surface and a width 20 of a pattern A of the sacrifice layer 17 shown in FIG. 8A. For example, when the etching time is constant (fixed), it can be restricted by the width 20 of the pattern A of the sacrifice layer 17, and when the width 20 of the pattern A of the sacrifice layer 17 is constant (fixed), it can be controlled by the etching time after the silicon substrate 1 is penetrated to the surface. Herein, the width of the pattern A may be, for example, from 120 μm to 60 μm.

Furthermore, the position of the lower apex 50*b* of the beam 2 can be controlled by the processing time of anisotropic etching and the pattern of the etching mask on the rear surface of the silicon substrate 1. That is, it can be controlled by the time of anisotropic etching and a width 21 of a pattern B formed by the etching mask (for example, thermoplastic resin) 14 shown in FIG. 8C. For example, when the etching time is constant (fixed), it can be controlled by the width 21 of the pattern B of the etching mask (for example, thermoplastic resin) 14, and, when the width 21 of the pattern B is constant (fixed), it can be controlled by the time of anisotropic etching. Herein, the width of the pattern B may be, for example, from 5 μm to 500 μm.

Note that, because the etching rate of the respective crystal orientation planes and the smoothness of the etching surfaces differ in accordance with the conditions, such as type, concentration, and temperature, of the alkaline solution serving as the anisotropic etchant, it is desirable that the suitable conditions be selected by experiments. In particular, it is desirable that the conditions be selected such that the upper apex 50*a* and the lower apex 50*b* can be formed.

A concrete example of anisotropic etching processing will be described below.

In this example, an experiment was performed using a 22 weight percent solution of TMAH, at an etchant temperature of 80° C. Taking into consideration the result obtained from the experiment, the pattern A shown in FIG. 8A was formed to have a width of 8 μm, and the pattern B of the opening shown in FIG. 8C was formed to have a width of 160 μm. Then, anisotropic etching was performed for a predetermined period of time. As a result, it became clear that the etching rates had the following relationship.

Figure 9A:
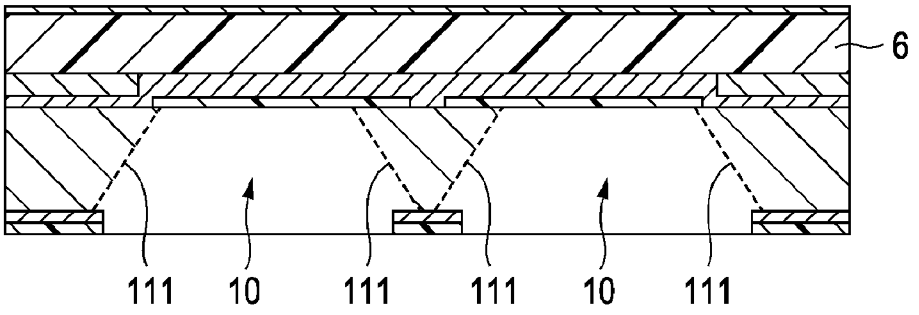
FIGS. 9A to 9C are cross-sectional views showing a process of the manufacturing method according to the fourth embodiment.
Figure 9B:
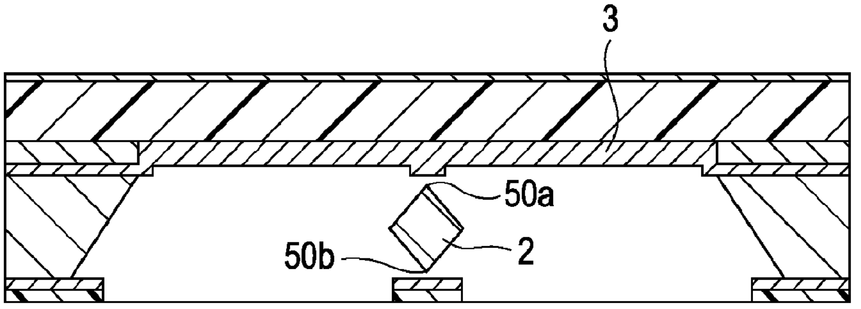
Figure 9C:
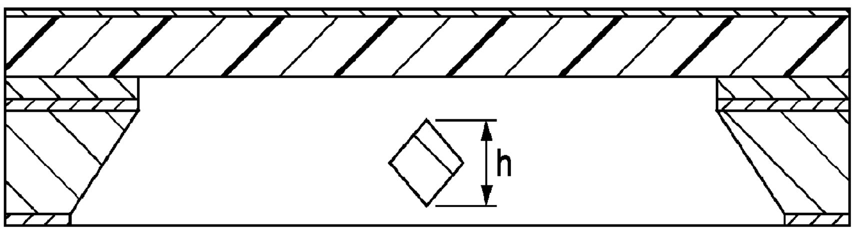

(1) The etching rate of the crystal orientation plane <100>: X μm/min (2) The etching rate of the crystal orientation plane <111>: 0.13X μm/min (3) The etching rate of the apex between two sides composed of the crystal orientation planes <111>: 2X μm/min (4) The etching rate of the crystal orientation plane <100> having an apex between two sides composed of the crystal orientation planes <100> and <111>: 8X μm/min FIGS. 9A to 9C are cross-sectional views showing progress of etching. The sectional plane is the same as that shown in FIG. 7C.

FIG. 9A shows a state in which anisotropic etching starting from the rear surface of the silicon substrate 1 penetrates to the surface of the silicon substrate 1, and part of the sacrifice layer 17 is exposed. At this point in time, the lower apex 50*b* of the beam 2 is not yet formed.

FIG. 9B shows a state in which anisotropic etching of the silicon substrate 1 has been completed. Both the upper apex 50*a* and the lower apex 50*b* of the beam 2 are formed before the completion of the anisotropic etching. The dimensions of the patterns A and B can be set such that predetermined anisotropic etching is performed after the upper apex 50*a* and the lower apex 50*b* of the beam 2 are formed. In FIGS. 9A to 9C, as a concrete example, the width of the pattern A is 8 μm.

The positions of the upper apex 50*a* and lower apex 50*b* of the beam 2 can be controlled by the shapes and dimensions of the patterns A and B. In this example, as shown in FIG. 9C, the height of the beam 2 is about 480 μm. The thickness of the silicon substrate 1 was 625 μm.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-319720 filed Dec. 16, 2008, which is hereby incorporated by reference herein in its entirety.

What is claimed is:

1. A method for producing a liquid discharge head including a silicon substrate having, on a first surface, energy generating elements configured to generate energy for discharging liquid from discharge ports, and a supply port penetrating the substrate from the first surface to a second surface, which is a rear surface of the first surface of the substrate, the supply port being configured to supply liquid to the energy generating elements, the method comprising the steps of:

preparing the silicon substrate having a sacrifice layer that is in contact with a portion of the first surface where the ink supply port is to be formed and is composed of a material capable of being isotropically etched by an alkaline solution, and an etching mask layer having a plurality of openings on the second surface, the volume of a portion of the sacrifice layer at a position corresponding to a portion between two adjacent said openings being smaller than the volume of a portion of the sacrifice layer at a position corresponding to the opening;

exposing the sacrifice layer by performing crystal anisotropic etching on the silicon substrate from the plurality of openings with the alkaline solution; and etching the sacrifice layer with the alkaline solution.

2. The method according to claim 1, wherein etching of the silicon substrate is continued after the sacrifice layer has been etched, and the etching of the silicon substrate is finished leaving a silicon piece at a position of the silicon substrate corresponding to the portion between the two adjacent openings.

3. The method according to claim 1, wherein the thickness of the portion of the sacrifice layer at the position corresponding to the portion between the two adjacent openings is smaller than the thickness of the portion of the sacrifice layer at the position corresponding to the opening.

4. The method according to claim 1, wherein the alkaline solution is a liquid containing tetramethyl ammonium hydroxide.

5. The method according to claim 1, wherein the sacrifice layer contains aluminum.

6. A method for producing a liquid discharge head including a silicon substrate having, on a first surface, energy generating elements configured to generate energy for discharging liquid from discharge ports, and a supply port penetrating the substrate from the first surface to a second surface, which is a rear surface of the first surface of the substrate, the supply port being configured to supply liquid to the energy generating elements, the method comprising the steps of:

preparing the silicon substrate having a sacrifice layer that is in contact with a portion of the first surface where the ink supply port is to be formed and is composed of a material capable of being isotropically etched by an alkaline solution, and an etching mask layer having a plurality of openings on the second surface, the etching rate by the alkaline solution of a portion of the sacrifice layer at a position corresponding to a portion between two adjacent said openings being lower than the etching rate by the alkaline solution of a portion of the sacrifice layer at a position corresponding to the opening;

exposing the sacrifice layer by performing crystal anisotropic etching on the silicon substrate from the plurality of openings with the alkaline solution; and etching the sacrifice layer with the alkaline solution.

7. The method according to claim 6, wherein a portion of the sacrifice layer provided at the position corresponding to the portion between the two adjacent openings is composed of polysilicon, wherein a portion provided at the position corresponding to the opening is composed of aluminum, and wherein the alkaline solution is a liquid containing tetramethyl ammonium hydroxide.

* * * * *